May 21, 1946. E. GISONDI Re. 22,758

FASTENING DEVICE

Original Filed July 24, 1941

INVENTOR.
Emanuel Gisondi

BY Harry Radzinsky Attorney

Reissued May 21, 1946 Re. 22,758

UNITED STATES PATENT OFFICE 22,758

FASTENING DEVICE

Emanuel Gisondi, Larchmont, N. Y.

Original No. 2,369,961, dated February 20, 1945, Serial No. 482,101, April 7, 1943, which is a division of Serial No. 403,871, July 24, 1941, now Patent No. 2,325,766, dated August 3, 1943. Application for reissue February 19, 1946, Serial No. 648,800

6 Claims. (Cl. 85—13)

This application is a division of my application No. 403,871, filed July 24, 1941, which issued as U. S. Patent No. 2,325,766 on August 3, 1943.

This invention relates to nails or similar fasteners, and particularly to those of the character employed for attaching wall board or other penetrable sheet material to penetrable siding or other types of supporting bases.

More particularly, the invention contemplates the provision of a nail or like fastening element of this character, wholly formed from sheet metal, whereby it may be stamped out speedily and economically in quantity. The invention also contemplates as one of its objects, the provision of a nail having at least two prongs which bend over and spread apart when driven into the wall board and siding, thereby securely attaching the board in place.

The invention further contemplates the provision of a nail having prongs so shaped and formed, and weakened at specified points, so that bending or clenching over of the prongs at one or more of said points is assured, resulting in an extremely secure anchorage of the nail in the material into which it is driven. The invention also includes the provision of means by which the extent of bending of the prongs is determined, as well as the location of the bend, so that adaptation of this type of nail to materials of different thicknesses and degrees of penetrability may be readily had.

Figure 1:
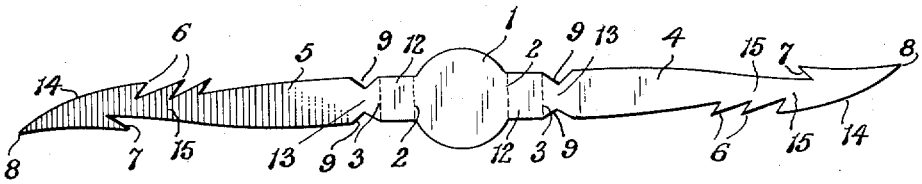
Figure 2:
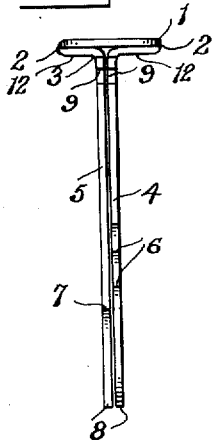
Figure 3:
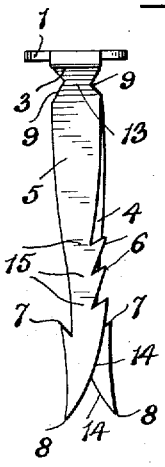
Figure 6:
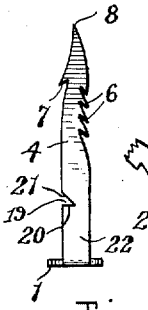
Figure 7:
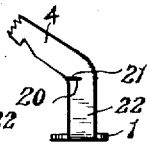
Figure 4:
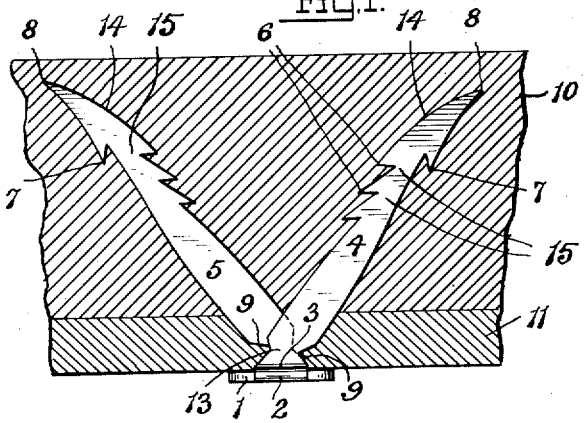
Figure 5:
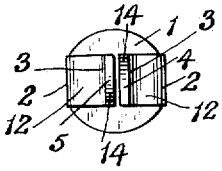

In the accompanying drawing, Fig. 1 is a face view of the sheet metal blank from which one of the nails is formed; Fig. 2 is an edge view of the finished nail; Fig. 3 is a side elevation of the nail; Fig. 4 shows one of the nails in place; Fig. 5 is a view of the end of the nail; Fig. 6 is a side view of a modified form of nail in which the bending point or notch is spaced from the head, and Fig. 7 shows a prong of the character disclosed in Fig. 6, in bent condition with the notch closed.

The improved nail is preferably made from sheet metal and from a single stamped-out blank, which by means of suitable bends or folds, is transformed from the flat blank of Fig. 1 to the finished nail shown in Figs. 2 and 3.

In the blank shown in Fig. 1, 1 indicates a disc-like portion, located substantially at the center of the blank, which portion forms the head of the resultant nail. In the blank, the two prongs 4 and 5 extend laterally from the disk 1. Each of these prongs is provided with the barbs or serrations 6 and 7, and each prong terminates in the pointed extremity 8. In producing the nail, each prong is bent inwardly on the dotted line 2 so that the portion of the prong indicated at 12 is disposed flatwisely against a face of the disk 1. The prong is bent outwardly on the dotted line 3, so that the two prongs extend outwardly from the head or disk 1, at right angles to the plane of the disk, as clearly seen in Figs. 2 and 3.

In Fig. 4 will be seen the manner in which one of these nails operates to attach sheet material, such as wall board indicated at 11, to an under material of penetrable nature, such as composition siding or the like, indicated at 10. It will be noted that each of the prongs 4 and 5 is provided, adjacent to its point of joinder to the head portion of the nail, or at a point which may be said to be the base of the prong, with notches 9 extending inwardly from its opposite edges. The formation of these notches 9 produces a narrow neck portion 13 between them, constituting a bending point for the prong.

As the prongs are driven into the wall board 11 and backing 10, they tend to bend over or buckle at these notched points 9, and thus the two prongs tend to diverge or spread apart within the body of the material into which they are driven, so that they are very firmly anchored therein and will not pull out. It will be further noted that one of the edges of each prong, located adjacent to the point or tip 8, is convexed or curved as indicated at 14, the two curved edges on the prongs being directed toward one another. These curved edges, on meeting the resistance of the material into which the prongs are driven, cause the prongs to bend on the points 13 and spread apart, so that the co-operation between these curved edges and the weakened bending points 13 enables the pointed prongs to be spread farther apart on each nail-driving hammer blow.

The serrated portions 6 and 7 not only form barbs which act to resist withdrawal of the prongs from the material into which they are driven, but also serve to produce weakened points adjacent to the pointed extremities on the prongs, such points being indicated at 15. As the prongs are driven into the material, they tend to bend or buckle sidewise, or across their planes, so that in the case of a fully driven-in nail, the prongs have not only spread apart or "scissored," as clearly seen in Fig. 4, but have also bent or buckled over laterally, thus securing exceptionally firm embedment into the material into which the nail has been driven.

In the embodiment of the invention shown in Figs. 1 to 4 inclusive, the notches 9 are shown as being located relatively close to the head 1 of the nail. Since the location of one or more of these notches in each prong is determinative of the point at which the prong will bend, it will be obvious that by locating one or more of these notches at a selected point on the prong, the bending of the prong at that point may be determined in advance. This is illustrated in Figs. 6 and 7 wherein a notch 19 is shown in one of the prongs and at a desired distance from the head of the nail. When a prong of this construction is driven into the material, it will bend at the notch 19, thus leaving a straight or unbent portion in the shank of the prong between the notch 19 and head 1, as indicated at 22. This construction is advantageous for attaching wall board of a definite thickness to a penetrable backing, when it is desirable to have a straight portion of the prong extent through the wall board and the bent or clenched over parts of the prongs wholly disposed within the penetrable backing. In providing a notch of the form shown at 19, the extent of bending-over of the prongs can be controlled, for it will be noted in Fig. 6 that the notch therein shown is formed with a horizontal shoulder 20 and an angularly positioned shoulder 21. When the prong is bent at the notch, as shown in Fig. 7, it continues bending until the notch is closed, or in other words, until the angular shoulder 21 abuts against the shoulder 20, thus retarding further bending of the prong.

What I claim is:

1. A sheet-metal nail for use in low density materials or the like, comprising, a relatively disk-like head portion having diametrically opposite, inwardly-bent parts underlying the head and reinforcing the same, said parts having downwardly projecting leg-extensions forming material-penetrating barbed prongs, said prongs being normally in flatwise contact and adapted to scissor apart when driven into the material, said scissoring movement of the prongs being parallel to the planes of the prongs, each of the prongs being notched relatively close to the head, whereby said prongs will buckle at said notches when driven into the material.

2. A sheet-metal nail for use in low density materials or the like, comprising, an elongated section of sheet metal having prongs provided with pointed extremities, a centrally located disk between the prongs constituting a head for the nail, parts folded inwardly and disposed beneath the disk to reinforce the same, said parts being bent downwardly, the prongs forming downward continuations of said parts, said prongs being notched at the points of joinder to the parts, the prongs being normally in flatwise contact and adapted to buckle on the notches and scissor apart when driven into the material, said prongs having curved inner edges and having a plurality of barbs on the same edges.

3. A sheet-metal nail having a pair of prongs normally in flatwise contact, each of the prongs having a curved edge portion, the curved edge portion of one prong being directly toward the curved edge portion of the other prong, said edges being barbed above their curved portions, the upper end portion of each prong having a notch to facilitate bending of the prongs in a direction away from each other and parallel to the plane of each prong, said notch being located remote from the barbed portion of each prong, and a disk-like head formed integrally with the prongs and including folded parts in flattened contact against the underside of the head to thereby stiffen and reinforce said head.

4. A sheet-metal nail for use in low density materials offering little resistance to penetration and withdrawal of the ordinary nail, comprising, a disk-like flat head, parts located diametrically opposite on said head and folded beneath and into contact with the lower face of the head to reinforce the head, prongs extending integrally downward from said head, said prongs being normally in flatwise contact with one another, said prongs being curved along edges facing one another, barbs on the same edges as the curved portions, the opposite edges of said prongs being notched to provide weakened points on which the prongs buckle to "scissor" the prongs apart when the prongs are driven into the material.

5. A sheet-metal nail for use in low density materials or the like, comprising, an elongated section of sheet metal having prongs provided with pointed extremities, a centrally located head portion between the prongs constituting a head for the nail, parts folded inwardly and disposed beneath the head portion to reinforce the same, said parts being bent downwardly, the prongs forming downward continuations of said parts, said prongs being notched at the points of joinder to the parts, the prongs being normally in flatwise contact and adapted to buckle on the notches and scissor apart when driven into the material.

6. A sheet-metal nail for use in low density materials or the like comprising a relatively flat head portion having at opposite sides inwardly-bent parts underlying the head and reinforcing the same, said parts having downwardly projecting leg-extensions forming material-penetrating prongs, said prongs being normally in flatwise contact and having respectively oppositely inclined wedge points cooperating with the material to cause the prongs to scissor apart when driven into the material, said scissoring movement of the prongs being parallel to the planes of the prongs, each of said prongs having in an edge thereof, relatively close to the head a notch to facilitate edgewise bending of the prongs when scissoring apart.

EMANUEL GISONDI.